United States Patent [19]

Chen

[11] 4,064,025

[45] Dec. 20, 1977

[54] SEPARATION OF CARBON AND NITROGEN ISOTOPES BY SELECTIVE PHOTODISSOCIATION AZO OR DIAZO COMPOUNDS

[75] Inventor: Hao-Lin Chen, Walnut Creek, Calif.

[73] Assignee: The United States of America as represented by the United States Energy Research & Development Administration, Washington, D.C.

[21] Appl. No.: 744,475

[22] Filed: Nov. 24, 1976

[51] Int. Cl.$^2$ .............................................. B01J 1/10
[52] U.S. Cl. ........................ 204/158 R; 204/DIG. 11
[58] Field of Search ................... 204/DIG. 11, 158 R

[56] References Cited

PUBLICATIONS

JACS, Aug. 6, 1975, pp. 4760–4761.
Billings, et al., Journal of Chemical Physics, vol. 21, No. 10, (Oct. 1953), pp. 1762–1763.

*Primary Examiner*—Howard S. Williams
*Attorney, Agent, or Firm*—Dean E. Carlson; Roger S. Gaither; Irene S. Croft

[57] ABSTRACT

Separation of isotopes, particularly of carbon or nitrogen, is achieved by the selective photodissociation of an azo compound or a diazoalkane, particularly azomethane or diazomethane.

17 Claims, No Drawings

SEPARATION OF CARBON AND NITROGEN ISOTOPES BY SELECTIVE PHOTODISSOCIATION AZO OR DIAZO COMPOUNDS

BACKGROUND OF THE INVENTION

The invention described herein was made in the course of, or under, Energy Research and Development Administration Contract No. W-7405-ENG-48 with University of California.

This invention relates to a method of separating isotopes, particularly of carbon or nitrogen, by selective photodissociation, that is, selective photoexcitation followed by chemical dissociation. More particularly, this invention relates to the enrichment of carbon and/or nitrogen isotopes by selective photodissociation of an azo compound or a diazoalkane.

$^{15}N$ and $^{13}C$ occur naturally with an abundance of 0.37% and 1.11%, respectively, and the present cost of each isotope is about $1000/mole for 95% enriched substance. $^{15}N$ is useful as a radioactive tracer to study the movement of fertilizers, nutrients and pollutants in the biosphere and is also useful in the form uranium nitrate in fission reactors; both $^{13}C$ and $^{15}N$ are useful as medical and geophysical tracers. The present cost of these isotopes make them attractive candidates for a low cost laser isotope separation process.

Laser isotope separation processes involve (1) selective photoexcitation, which makes use of the phenomenon known as isotope shift, i.e., a slight shift of the lines in the absorption spectra of elements or molecules due to the small difference in nuclear mass of the isotopes of the same element contained therein, and (2) a mechanism for separating selectively excited species from nonexcited species.

In selective photodissociation, separation is achieved by dissociation of the excited species without substantial dissociation of nonexcited species. In general, the dissociation products are smaller molecules of greatly enriched isotope content which are easily separated from the reaction mixture by standard chemical means. Dissociation of the excited species may occur spontaneously or may require the absorption of additional photons (multiphoton absorption process). A general description of selective photodissociation schemes is given in C. B. Moore, *Accounts of Chemical Research* 6 323 (1973).

SUMMARY OF THE INVENTION

According to the present invention, a product enriched in a desired isotope, particularly of carbon or nitrogen, is obtained by irradiating an organo-nitrogen compound selected from an azo compound or a diazoalkane at a predetermined wavelength to selectively excite those molecules containing the desired isotope. The excited species then undergo dissociation, either spontaneously or by the absorption of additional photons, to yield molecular nitrogen and a carbon containing radical molecule which can readily be removed from the reaction system by reaction with an appropriate scavenger, such as an alkene. The dissociation products can be separated from each other and from the depleted isotope source by standard chemical means.

It is, therefore, an object of this invention to provide a method for separating isotopes by selective photodissociation.

More particularly, it is an object of this invention to provide a method for separating isotopes of carbon or nitrogen by selective photodissociation of an azo compound or a diazoalkane as the isotope source.

Other objects and advantages will become apparent from the following detailed description.

DETAILED DESCRIPTION OF THE INVENTION

The isotope source used in the present invention is an organic nitrogen compound selected from an azo compound of the formula: $R_1N = NR_2$ and a diazoalkane having the linear structure: $R_3R_4C = N^+ = N^-$. (The structure of diazoalkanes may also be represented by $R_3R_4C^- - N^+ \equiv N$ or $R_3R_4C^+ - N = N^-$ as shown in *The Encyclopedia of Chemistry*, Third Edition, C. A. Hampel and G. G. Hawley, Ed., Van Nostrand Reinhold Company, N. Y., 1973.) In the foregoing formulas $R_1$ and $R_2$ may be the same or different and may be any organic radical, such as alkyl, aryl, acyl, carboxyl, alkoxy and the like, and $R_3$ and $R_4$ may be the same or different and are selected from hydrogen and any organic radical, such as alkyl, aryl, acyl, carboxyl, alkoxy and the like. It is preferred that the radical molecule, that is, $R_1\cdot$, $R_2\cdot$ and $R_3R_4C\cdot$, be kept relatively simple so that the effective isotope shift is not reduced by unrelated dissociation and/or reactions within the radical itself. Moreover, the more complex molecules have more complicated absorption spectra. The rotational and vibrational level spacings of molecules decrease with increasing nuclear mass so that the absorption bands of an isotopically substituted molecule may overlap those of the abundant molecule. Therefore, small linear molecules are preferred. For the purposes of the present invention, it is preferred that $R_1\cdot$, $R_2\cdot$, and $R_3R_4C\cdot$ be an alkyl radical of 1 – 3 carbon atoms, specifically, the methyl radical.

Because of the isotopic shift phenomenon there exists a frequency $\nu_1$ (or wavelength $\lambda_1$) at which one isotopic species absorbs radiation but at which the other species are transparent. Thus, selective excitation of that isotopic species is accomplished by irradiation with a source, such as a laser, which is sufficiently monochromatic and tunable to excite the absorption of that isotopic species and not the others. Suitable wavelengths for the selective excitation step are readily determined on the basis of the optical spectra of the particular compound used as the isotope source. Such optical spectra, if not available in standard reference texts, are readily obtained by conventional spectroscopic procedures.

In the present process, selective excitation of the desired isotopic species may be achieved by way of an electronic transition or a vibrational transition. If an electronic transition is utilized, UV (ultraviolet) or visible radiation will be required for excitation. For example, azomethane, $CH_3N = NCH_3$, absorbs in the region $3200 \text{ Å} < \lambda < 3900 \text{ Å}$ with a cross section $\sigma_{azo} \sim 10^{-20} - 10^{-19} \text{ cm}^2$. Diazomethane, $CH_2 = N = N$, absorbs in the region $3600 \text{ Å} < \lambda_1 < 4600 \text{ Å}$ with a cross section $\sigma_{diazo} \sim 10^{-20} \text{ cm}^2$; the isotope shift between $CH_2^{14}N_2$ and $CH_2^{14}N^{15}N$, as measured by Moore and Pimentel (*Jour. Chem. Phys.* 40 329, 1963) is 5 – 9 cm$^{-1}$ depending upon which vibrational mode is considered. An advantage of utilizing electronic excitation is that the excited molecules spontaneously undergo dissociation; the absorption of additional photons is not required for dissociation. Thus, this method provides a "single photon" process. The most suitable lasers for selective electronic excitation are the finely tunable dye lasers. Reference is made to *Handbook of Lasers*, Robert J. Pressley, Ed., Chemical Rubber Co., Cleveland, Ohio (1971) for selection of a dye laser emitting in the appropriate wavelength region.

A vibrational transition can also be utilized for the selective excitation step, thereby making it possible to take advantage of readily available and highly efficient infrared (IR) lasers such as the $CO_2$ laser. However, when using an IR laser for selective excitation, the absorption of additional photons is required for the subsequent molecular dissociation step. Thus, this method is a "multiphoton" absorption process. Only the first photon absorbed need be selective, that is, of wavelength $\lambda_1$; the additional photons required to provide the energy necessary for molecular dissociation may be supplied by a broadband laser or a resonance lamp. Most efficiently, however, a single IR laser is used to supply both excitation and dissociation photons.

The mechanism of dissociation of the excited molecules can be represented by the following equations:

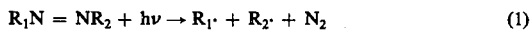

$$R_1N = NR_2 + h\nu \rightarrow R_1\cdot + R_2\cdot + N_2 \quad (1)$$

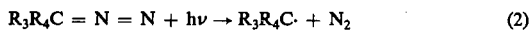

$$R_3R_4C = N = N + h\nu \rightarrow R_3R_4C\cdot + N_2 \quad (2)$$

The radical molecules are highly reactive and can be readily removed by scavenging, that is, reaction with an appropriate material, for example, an alkene, particularly and alkene of less than three carbon atoms. Molecular nitrogen is one of the most stable molecules and it will retain its molecular form for later extraction with none of the complications, such as charge exchange, isotope exchange, collisional de-excitation, etc., which are concomitants of other laser isotope separation schemes.

The process of the present invention can be carried out in either the gas phase or the solid phase. Typically, in gas phase operation the isotope source is vaporized in a suitable absorption cell to a pressure in the range of about 10 – 20 torr. A readily vaporizable scavenger is also provided in the cell for trapping the radical molecules produced by dissociation of the azo compound or diazoalkane. Any compound that can react readily with the resulting radical can be used as a scavenger; however, a scavenger should be selected that does not absorb in the spectral region used in the irradiation step. The amount of scavenger provided need only be sufficient to react with the excited species.

The gaseous mixture in the absorption cell is then subjected to radiation at least a portion of which is at the predetermined wavelength $\lambda_1$ to excite those molecules containing the desired isotope without exciting those molecules containing an undesired isotope. The total amount of energy provided by the irradiation operation must be sufficient to induce molecular dissociation of the excited molecules. The resulting irradiated mixture consists of depleted isotope source, reaction product of the radical molecule and scavenger, and molecular nitrogen. The components of the irradiated mixture are readily separated by standard chemical procedures such as cold trapping. Depending upon whether $\lambda_1$ is selective for a carbon isotope or a nitrogen isotope, the isotopically enriched product is either the radical-scavenger reaction product or molecular nitrogen.

For solid phase operation, the organic nitrogen compound can be incorporated dilute in a chemically non-interfering matrix (e.g., argon) at a very low temperature. The matrix serves as a host, rigidly encompassing the molecules of the guest nitrogen compound. The matrix constrains the movement of the guest so that it is isolated from other guests and rotational motion can be prevented so that a single absorption line appears for each vibrational state. In very dilute concentrations, the matrix isolated spectral bands for the guest molecules are narrowed so that isotopic selectivity is appreciably enhanced.

When operating in the solid phase, it is not necessary to provide a scavenger. The molecular nitrogen resulting from the dissociation can be pumped off and the radical molecules diffuse through the matrix and combine.

The following example is illustrative of the present invention.

EXAMPLE

Considering the separation of $^{15}N$ using diazomethane as the isotope source, a gaseous mixture of diazomethane and ethylene as a scavenging agent is provided in a suitable absorption cell in a mole ratio of diazomethane to ethylene of about 10:1.

The gaseous mixture is irradiated with a nitrogen-pumped dye lasser with FWHM (full width half maximum) tuned to emit at 4358 A to selectively excite an electronic transition in $CH_2{}^{14}N{}^{15}N$. The selectively excited molecules spontaneously dissociate, leaving unexcited molecules ($CH_1{}^{14}N_2$) undisturbed. The dissociation reaction is represented by the following equation:

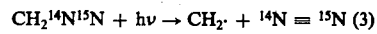

$$CH_2{}^{14}N{}^{15}N + h\nu \rightarrow CH_2\cdot + {}^{14}N \equiv {}^{15}N \quad (3)$$

The methylene radicals produced react with the ethylene scavenger as follows:

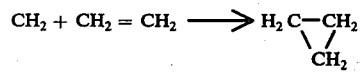

The irradiated mixture is then deposited on a cold surface maintained at liquid nitrogen temperatures (about 77 K); the enriched molecular nitrogen is pumped off leaving a mixture of depleted diazomethane and cyclopropane.

Depleted diazomethane, after separation from the cyclopropane by low temperature distillation is reacted with natural isotopic abundance HCN or $N_2$ in an exchange column containing a suitable porous solid surface for isotope exchange to replenish the depleted diazomethane with $^{15}N$. The replenished diazomethane is returned to the absorption cell.

Alternatively, the diazomethane molecules can be incorporated in a matrix of molecules or argon in a very dilute concentration of diazomethane to argon of about 1:1000 by spraying the diazomethane/argon mixture on a cold surface maintained at cryogenic temperatures. Irradiation is then accomplished as above. Enriched molecular nitrogen is pumped off and the remaining components are separated from one another in a separate chamber. Depleted diazomethane can be replenished with $^{15}N$ as above.

By tuning the laser to an absorption line selective for $^{13}CH_2N_2$, the system described in the example can be used for $^{13}C$ enrichment, the resulting methylene radical being the isotopically enriched product.

The above scheme is also applicable to the separation of hydrogen isotopes.

Although the invention has been described with reference to specific examples, various modifications and changes will be apparent to those skilled in the art, all of which may be achieved without departing from the spirit and scope of the invention as defined by the following claims.

What I claim is:

1. A method for the separation of isotopes by selective photodissociation of an organic nitrogen compound selected from an azo compound having the formula $R_1N = NR_2$ wherein $R_1$ and $R_2$ represent the same or different organic radical and a diazoalkane having the linear structure $R_3R_4C = N^+ = N^-$ wherein $R_3$ and $R_4$ are the same or different and are selected from hydrogen and an organic radical, said organic nitrogen compound containing an element in a plurality of isotopes, the optical absorption of molecules containing a first such isotope being spearated from the optical absorption of molecules containing a second isotope of the same element by an isotope shift, the method comprising:

a. subjecting said organic nitrogen compound to radiation, at least a portion of said radiation being at a predetermined wavelength $\lambda_1$ to selectively excite molecules containing the first isotope, said radiation having sufficient energy to dissociate the selectively excited molecules into molecular nitrogen and a radical product without substantially dissociating unexcited molecules, thereby producing a dissociation product enriched in the first isotope, and b. separating said dissociation product enriched in the first isotope from the reaction mixture.

2. A method according to claim 1 wherein the first isotope is an isotope of carbon and the dissociation product containing the first isotope is a radical product.

3. A method according to claim 2 wherein the isotope of carbon is $^{13}C$.

4. A method according to claim 1 wherein the first isotope is an isotope of nitrogen and the dissociation product containing the first isotope is molecular nitrogen.

5. A method according to claim 4 wherein the desired isotope of nitrogen is $^{15}N$.

6. A method according to claim 1 further defined by mixing with the organic nitrogen compound a scavenging agent in an amount sufficient to react with the radical product formed by the dissociation of selectively excited molecules, thereby trapping the radical product.

7. A method according to claim 6 wherein the scavenging agent is an alkene.

8. A method according to claim 1 further defined by providing the organic nitrogen compound in the gas phase.

9. A method according to claim 1 further defined by providing the organic nitrogen compound in the solid phase.

10. A method according to claim 1 wherein the organic nitrogen compound is the azo compound.

11. A method according to claim 10 wherein $R_1$ and $R_2$ represent the same or different alkyl radical of 1 to 3 carbon atoms.

12. A method according to claim 11 wherein the azo compound is azomethane.

13. A method according to claim 1 wherein the organic nitrogen compound is the diazoalkane.

14. A method according to claim 13 wherein $R_3R_4C$ represents an alkyl radical of 1 to 3 carbon atoms.

15. A method according to claim 14 wherein the diazolkane is diazomethane.

16. A method according to claim 15 wherein the first isotope is $^{15}N$ and the dissociation product enriched in the first isotope is molecular nitrogen.

17. A method according to claim 16 further defined by mixing with the diazomethane an amount of ethylene sufficient to react with the methylene radical formed by the dissociation of selectively excited molecules, and providing said mixture in the gas phase.

* * * * *